(12) United States Patent
Hwang et al.

(10) Patent No.: US 7,262,266 B2
(45) Date of Patent: Aug. 28, 2007

(54) COPOLYMERIZATION OF POLYBENZAZOLES AND OTHER AROMATIC POLYMERS WITH CARBON NANOTUBES

(75) Inventors: Wen-Fang Hwang, Midland, MI (US); Richard E. Smalley, Houston, TX (US); Robert H. Hauge, Houston, TX (US)

(73) Assignee: William Marsh Rice University, Houston, TX (US)

( * ) Notice: Subject to any disclaimer, the term of this patent is extended or adjusted under 35 U.S.C. 154(b) by 389 days.

(21) Appl. No.: 10/972,560

(22) Filed: Oct. 25, 2004

(65) Prior Publication Data

US 2005/0171281 A1    Aug. 4, 2005

Related U.S. Application Data

(60) Provisional application No. 60/514,186, filed on Oct. 24, 2003.

(51) Int. Cl.
*C08G 81/00* (2006.01)
(52) U.S. Cl. ............ 528/405; 528/417; 528/422; 528/423; 977/750; 977/753; 977/783
(58) Field of Classification Search ............ 977/848, 977/742, 750, 897, 961, 748, 753, 783; 528/405, 528/417, 422, 423
See application file for complete search history.

(56) References Cited

U.S. PATENT DOCUMENTS

| | | | |
|---|---|---|---|
| 4,533,693 A | | 8/1985 | Wolfe et al. |
| 5,248,721 A | * | 9/1993 | Dixit et al. .................. 524/494 |
| 6,426,134 B1 | * | 7/2002 | Lavin et al. ............. 428/300.1 |
| 6,884,506 B2 | * | 4/2005 | Kitagawa .................... 428/372 |
| 7,005,550 B1 | * | 2/2006 | Tan et al. .................... 568/335 |
| 7,026,432 B2 | * | 4/2006 | Charati et al. .............. 528/271 |

FOREIGN PATENT DOCUMENTS

KR        200526990 A   *  7/2005

OTHER PUBLICATIONS

Zhao et al, "Synthesis and Properties of a Water-Soluble Single-Walled Carbon Nanotube-Poly(m-aminobenzene sulfonic acid) Graft Copolymer", Adv. Funct. Mater. 14, No. 1, Jan. 2004.*

Chen et al, "Grafting of Poly(tBA) and PtBA-b-PMMA onto the Surface of SWNTs Using Carbanions as the Initiator", Macromol. Rapid Commun. 27, 882-887, 2006.*
Lazzari et al, "Block Copolymers as a Tool for Nanomaterial Fabrication", Adv. Mater. 15, No. 19, Oct. 2, 2003.*
Urata, "Unique Block Molecules Based on Glycerol Skeleton as C-3 Building Blocks for Liquid Crystals Formation by Self-Assembly and Their Future Potential for the Nano-chemistry" Eur. J. Lipid Sci. Technol. 105, pp. 542-556, 2003.*
Chae et al, "Rigid-Rod Polymeric Fibers", J. of Applied Polymer Science, vol. 100, pp. 791-802, 2006.*
Iijima, "Helical microtubules of graphitic carbon", 354 Nature (1991), pp. 56-58.
Iijima et al., "Single-shell carbon nanotubes of 1-nm diameter", 363 Nature (1993), pp. 603-605.
Bethune et al., "Cobalt-catalysed growth of carbon nanotubes with single-atomic layer walls", 363 Nature (1993), pp. 605-607.
Baughman et al., "Carbon Nanotubes—the Route Toward Applications" 297 Science (2002), pp. 787-792.
Mitchell et al., "Dispersion of Functionalized Carbon Nanotubes in Polystyrene" 35 Maromolecules (2002), pp. 8825-8830.
Zhu et al., "Improving the Dispersion and Integration of Single-Walled Carbon Nanotubes in Epoxy Composites through Functionalization", 3 Nano. Letters (2003), pp. 1107-1113.
Vigolo et al., "Macroscopic Fibers and Ribbons of Oriented Carbon Nanotubes", 290 Science (2000), pp. 1331-1334.
Zhou et al., "Single wall carbon nanotube fibers extruded from super-acid suspensions: . . . " 95 J. Appl. Phys. (2004), pp. 649-655.
Ericson et al., "Macroscopic, Neat, Single-Walled Carbon Nanotube Fibers" 305 Science (2004), pp. 1447-1450.
Chiang et al., "Purification and Characterization of Single-Wall Carbon Nanotubes", 105 J. Phys. Chem. B (2001), pp. 1157-1161.
Chiang et al., "Purification and Characterization of Single-Wall Carbon Nanotubes (SWCNs) . . . " 105 J. Phys. Chem. B (2001), pp. 8297-8301.
Liu et al., "Fullerene Pipes", 280 Science (1998), pp. 1253-1256.
Hu et al., "Cutting Single-Wall Carbon Nanotubes through Fluorination", 2 Nano Letters (2002), pp. 1009-1013.
Chen et al., "Solution Properties of Single-Walled Carbon Nanotubes" 282 Science (1998), pp. 95-98.

* cited by examiner

*Primary Examiner*—Susan Berman
(74) *Attorney, Agent, or Firm*—Robert C. Shaddox; Winstead PC

(57) ABSTRACT

The present invention is generally directed to the block copolymerization of rigid rod polymers with carbon nanotubes (CNTs), the CNTs generally being shortened, to form nanotube block copolymers. The present invention is also directed to fibers and other shaped articles made from the nanotube block copolymers of the present invention.

22 Claims, No Drawings

COPOLYMERIZATION OF POLYBENZAZOLES AND OTHER AROMATIC POLYMERS WITH CARBON NANOTUBES

CROSS REFERENCE TO RELATED APPLICATIONS

This Application claims priority to U.S. Provisional Patent Application Ser. No. 60/514,186, filed Oct. 24, 2003.

FIELD OF THE INVENTION

The present invention relates generally to carbon nanotube materials. More specifically, the invention relates to block copolymers comprising rigid rod polymer blocks and carbon nanotubes.

BACKGROUND OF THE INVENTION

Carbon nanotubes (CNTs), comprising multiple concentric shells and termed multi-wall carbon nanotubes (MWNTs), were discovered by Iijima in 1991 [Iijima, *Nature* 1991, 354, 56-58]. Subsequent to this discovery, single-wall carbon nanotubes (SWNTs), comprising single graphene sheets rolled up on themselves to form cylindrical tubes with nanoscale diameters, were synthesized in an arc-discharge process using carbon electrodes doped with transition metals [Iijima et al., *Nature* 1993, 363, 603-605; and Bethune et al., *Nature* 1993, 363, 605-607]. These carbon nanotubes (especially SWNTs) possess unique mechanical, electrical, thermal and optical properties, and such properties make them attractive for a wide variety of applications. See Baughman et al., *Science*, 2002, 297, 787-792.

The incorporation of CNTs into polymer matrices is currently an area of considerable interest, as CNTs can impart unique properties to the composite or blended material. See, e.g., Mitchell et al., *Macromolecules*, 2002, 35, 8825-8830; and Zhu et al., *Nano. Lett.*, 2003, 3, 1107-1113. In some cases, CNTs have been covalently integrated into such polymeric hosts.

Another area of interest is CNT-containing fibers. In some reports, such fibers comprise a polymer matrix, whereas in other cases they are largely CNTs. In such later cases, CNT fibers have been spun from CNT suspensions in poly(vinylalcohol) [Vigolo et al., *Science*, 2000, 290, 1331-1334] and intercalating acids [Zhou et al., *J. Appl. Phys.*, 2004, 95, 649-655; and Ericson et al., *Science*, 2004, 305, 1447-1450].

In light of the above-described advances in carbon nanotube science, new polymeric systems into which CNTs have been integrated into will continue to expand the range of applications with which they can be associated.

BRIEF DESCRIPTION OF THE INVENTION

The present invention is generally directed to the block copolymerization of rigid rod polymers with carbon nanotubes (CNTs). Such block copolymers, having a CNT block component and a rigid rod block component, are referred to herein as "nanotube block copolymers." The present invention is also directed to fibers and other shaped articles made from these nanotube block copolymers of the present invention.

In some embodiments, the CNT block component is a single-wall carbon nanotube (SWNT). Typically, such SWNTs are first cut with a cutting process to provide short SWNTs, then end functionalized with moieties capable of coupling to the rigid rod polymer block component. In some embodiments, the rigid rod polymer is a polybenzazole (PBZ). Block copolymers of the present invention comprising SWNTs and PBZ components are referred to herein as "SWNT/PBZ block copolymers."

In some embodiments, both the cutting of the SWNTs and the coupling of the shortened SWNTs to PBZ enhances the solubility and processability of SWNTs in strong acid solvents. Additionally, the use of PBZ in such block copolymers is advantageous in that it is both economical and minimizes the mitigation of mechanical properties intrinsic to the SWNTs.

The foregoing has outlined rather broadly the features of the present invention in order that the detailed description of the invention that follows may be better understood. Additional features and advantages of the invention will be described hereinafter which form the subject of the claims of the invention.

DETAILED DESCRIPTION OF THE INVENTION

In the following description, specific details are set forth such as specific quantities, sizes, etc. so as to provide a thorough understanding of embodiments of the present invention. However, it will be obvious to those skilled in the art that the present invention may be practiced without such specific details. In many cases, details concerning such considerations and the like have been omitted inasmuch as such details are not necessary to obtain a complete understanding of the present invention and are within the skills of persons of ordinary skill in the relevant art.

The present invention is generally directed to the block copolymerization of rigid rod polymers with carbon nanotubes (CNTs). Such block copolymers, having a CNT block component and a rigid rod block component, are referred to herein as "nanotube block copolymers." The present invention is also directed to fibers and other shaped articles made from these nanotube block copolymers of the present invention.

Block copolymers are polymers that comprise polymer or oligomer chains of one type of polymer that are connected with polymer or oligomer chains of one or more other types of polymers. Such polymerization leads to polymer chains having structures like that of the following di-block copolymer:

—AAAAAAAAAAAAAAAAA-BBBBBBBBBBBBBBBB— or tri-block copolymer:

—AAAAAAAAAAA-BBBBBBBBBBB-AAAAAAAAAA—, where "A" is a repeat unit (i.e., a "mer") for a first polymer block, and "B" is a repeat unit for a second polymer block. An example of a common block copolymer is poly(styrene-butadiene-styrene), or SBS.

In the case of the present invention, one of the polymer blocks is a carbon nanotube (itself an all carbon rigid polymer) and one of the blocks is an organic-based rigid rod polymer or oligomer. For the purposes of this discussion, oligomers are merely short polymer chains and reference to polymer block components hereinafter as polymers will be understood to include oligomers.

The block copolymers of the present invention, referred to herein as nanotube block copolymers, typically comprise at least one CNT block and at least one rigid rod polymer block, although they may comprise blocks of other types as well.

In some embodiments, because of the possibility of multiple coupling (attachment) sites on each CNT end, one or both ends of the CNTs are coupled to multiple rigid rod polymer blocks.

CNTs, according to the present invention, include, but are not limited to, single-wall carbon nanotubes (SWNTs), multi-wall carbon nanotubes (MWNTs), double-wall carbon nanotubes (DWNTs), buckytubes, fullerene tubes, tubular fullerenes, graphite fibrils, and combinations thereof. Such carbon nanotubes can initially be of a variety and range of lengths, diameters, number of tube walls, chiralities (helicities), etc., and can generally be made by any known technique. The terms "carbon nanotube" and "nanotube" will be used interchangeably herein. Such CNTs are often subjected to one or more purification steps [see, e.g., Chiang et al., *J. Phys. Chem. B*, 2001, 105, 1157-1161; Chiang et al., *J. Phys. Chem. B* 2001, 105, 8297-8301]. In some embodiments, the CNTs are cut by one or more cutting techniques [see, e.g., Liu et al., *Science*, 1998, 280, 1253-1256; and Gu et al., *Nano Lett.*, 2002, 2, 1009-1013].

In some embodiments, the rigid rod polymer blocks are polybenzazoles (PBZ) or other aromatic polymers. PBZs have the general formula:

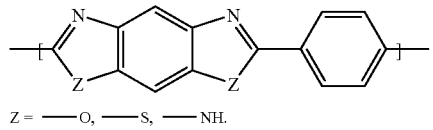

Z = ──O, ──S, ──NH.

Other suitable rigid rod polymer blocks are cis- and trans-polybezoxazole (PBO):

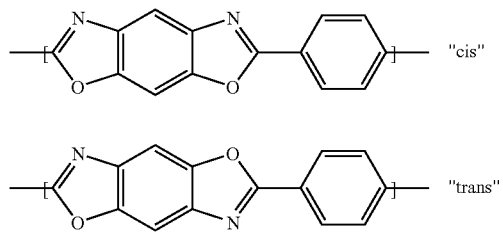

and cis- and trans-poly-p-phenylenebisbenzthiozole (PBT):

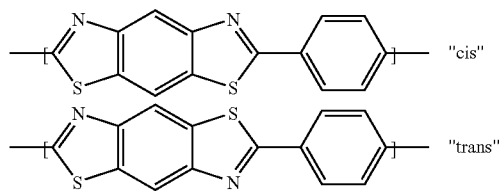

and poly-2,5-(bebzoxazole) (ABPBO):

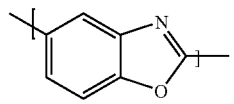

In some embodiments, SWNT blocks are coupled to rigid rod polymer blocks via a condensation reaction to form "SWNT block copolymers." In some embodiments, these rigid rod polymer blocks are PBZ. Block copolymers of the present invention comprising SWNTs and PBZ components are referred to herein as "SWNT/PBZ block copolymers."

In some embodiments, short SWNTS are covalently bonded to rigid rod polybenzazoles (PBZ) or other aromatic polymers of finite length to improve the solubility of SWNTs in mineral acids and other solvents and to prevent the formation of aggregates (ropes) of SWNTs.

In some embodiments, the spinning or casting of the above-mentioned SWNT/PBZ copolymers can be carried out from liquid crystalline solutions at higher concentrations than previously possible. This affords a more effective coagulation process and easy alignment of SWNT/PBZ copolymers during the spinning process.

In some embodiments, the coupling of PBZ and/or other aromatic polymers to short SWNTs improves the strength ("leg") of spinning or casting solutions due to stronger interaction between PBZ molecules. This can improve shaping processes and lead to shaped articles with ultra-high performance properties afforded by SWNTs.

In some embodiments, the present invention is directed to the synthesis of (i.e., methods of making) block copolymers comprising short SWNTs and rigid rod PBZ polymer blocks and/or other aromatic polymer blocks; fibers and other compositions containing these block copolymers; processes for making shaped articles from these block copolymers comprising rigid rod PBZ blocks and SWNT blocks; and shaped articles made by these processes.

In some embodiments, methods for making nanotube block copolymers comprise a cutting and end functionalization of SWNTs, followed by reaction with suitably functionalized rigid rod polymer blocks.

The synthesis of functionalized short SWNTs, according to some embodiments of the present invention, is shown below in Scheme 1:

Scheme 1

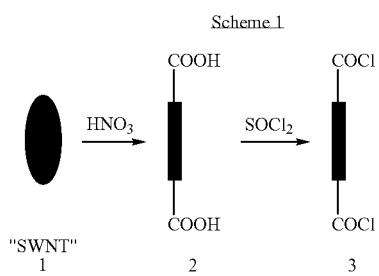

Referring to Scheme 1, SWNTs (1) are first cut in an oxidative acid (e.g., HNO₃) or acid mixture (e.g., piranha) to yield short SWNTs bearing carboxyl species (e.g., —COOH groups) on their open ends (2). Such carboxyl species can then be converted to acyl chloride species (—COCl) by reaction with thionyl chloride (SOCl₂) to yield (3). Such above-described chemistry is known in the art. See, e.g., Liu et al., *Science*, 1998, 280, 1253-1256; and Chen et al., *Science*, 1998, 282, 95-98.

In some embodiments of the present invention, short SWNTs are used to enhance the solubility of the SWNT blocks in strong acids such as sulfuric acid, methanesulfonic acid (MSA), and any other strong acids. Similarly, the short functionalized SWNT-COCl will have improved solubility in the above mentioned strong acids. The enhanced solubility of short SWNTs and their functionalized counterparts affords the advantage of SWNTs being processed (fibers spun or films cast) at higher SWNT concentrations in strong acids. The shaped articles, fibers or films, will generally have higher physical, mechanical strength due to the more effective process of coagulation and the enhanced orientability of SWNTs in these higher concentrated solutions.

As mentioned above, in some embodiments of the present invention, short SWNTs, generally with length of less than about 100 nm, typically less than 50 nm, and more typically 10-50 nm, are used. In general, such individual SWNTs have diameters of about 1 nm. Accordingly, some embodiments of the present invention use SWNTs with aspect ratios (defined as the length divided by diameter) of less than about 100; typically less than 50; and more typically between 10-50. Likewise, the functionalized SWNTs have aspect ratios generally less than about 100, typically less than 50, and more typically between 10 and 50.

In some embodiments, the functionalized group on the SWNT ends, shown as —COCl in Scheme 1, is an electron-deficient carbon group, but can generally be any group containing a carbon atom that can react in the mineral acid with an o-amino-basic moiety to form an azole ring (as illustrated in Scheme 2). Exemplary such groups include those listed in column 24, lines 59-66 of U.S. Pat. No. 4,533,693, incorporated by reference herein. Suitable electron-deficient groups include, but are not limited to, carboxylic acids, acid halide, metal carboxylate salts, cyano groups and trihalomethyl groups. Halogens in such electron-deficient carbon groups are typically fluorine, chlorine, or bromine, and more typically chlorine.

A synthesis of rigid rod polybenzazole (PBZ) blocks is shown below in Scheme 2, where an azole-forming moiety (4) is reacted with a species comprising an electron-deficient carbon moiety (5) to yield a PBZ polymer (6).

Scheme 2

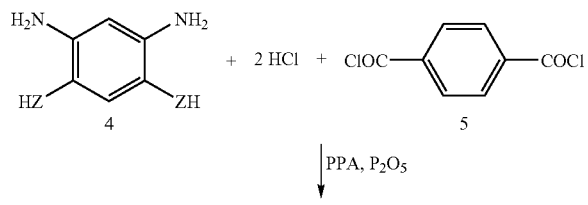

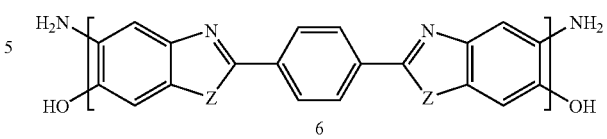

Referring to Scheme 2, n can generally be as low as 2 and as high as practically feasible (e.g., 2000). Typically, n is about 5 to 50, and more typically between 5 and 30. In the above Scheme 2, the azole-forming moiety (4) is an "o-amino-basic moiety" which is bonded to an aromatic group, comprising a primary amine group bonded to the aromatic group and a hydroxyl, thiol or primary or secondary amine group bonded to the aromatic group ortho to said primary amine group; i.e., Z is selected from the group consisting of O, S, NR, and combinations thereof; and R is selected from the group consisting of hydrogen, an aromatic group, an aliphatic group, and combinations thereof. The aromatic group in the azole-forming moiety may comprise a single aromatic ring, a fused ring or an unfused ring system comprising two or more aromatic moieties joined by bonds or by divalent moieties which are inert with respect to PBZ polymerizing reagents under polymerization conditions. The other reactant (5) in the above reaction comprises an electron-deficient carbon group. As mentioned above, this carbon group can be any group containing a carbon atom that can react in the mineral acid with an o-amino-basic moiety to form an azole ring, such as any of the groups listed in column 24, lines 59-66 of U.S. Pat. No. 4,533,693. Suitable electron-deficient groups are carboxylic acids, acid halide, metal carboxylate salts, cyano groups and trihalomethyl groups. Halogens in electron-deficient carbon groups are typically fluorine, chlorine, or bromine, and more typically chlorine.

The solvents used in the above reaction can be any mineral acid capable of dissolving the polymerizing reactants and PBZ polymers, such as sulfuric acid, methanesulfnic acid (MSA), trifluoromethanesulfonic acid, polyphosphoric acid, chlorosulfonic acid and mixtures thereof. The above acids and mixtures can also comprise P₂O₅. Detail of the above synthesis scheme is described in U.S. Pat. No. 5,075,392.

A key aspect of the present invention is the block copolymerization of short functionalized SWNTs (as shown in Scheme 1) with the rigid rod polyazole blocks (as shown in Scheme 2) in a strong acid such as sulfuric acid, methanesulfonic acid with P₂O₅, or other strong mineral acids capable of dissolving both reactants without any detrimental reaction or degradation of the reactants. The general reaction is shown in Scheme 3 below, where shortened functionalized SWNTs (3) are reacted with PBZ (6) to yield SWNT/PBZ block copolymer (7).

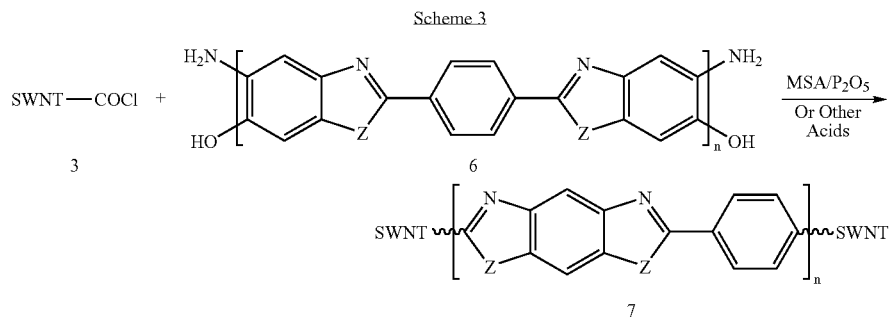

Scheme 3

In the above embodiments directed toward the formation of SWNT/PBZ block copolymers in acidic solvent, the total concentration of the two reactants in the acidic solvent (i.e., the short functionalized SWNTs and the polybenzazole blocks) is dependent upon the length of both of the block components. Generally, the concentration should be controlled and optimized such that the solution will have maximum concentration and minimum bulk viscosity for ease of processing, such as in fiber spinning or film casting. Dependent upon the concentration, the resultant copolymer solution can be optically isotropic or optically anisotropic, the latter of which can be liquid crystalline in form and probably nematic. Although the reaction between (3) and (6) in Scheme 3 shows the formation of a SWNT-(PBZ)$_n$-SWNT tri-block copolymer (7, wherein the SWNTs are themselves blocks), the reaction can be tailored to form di-block or random block copolymers of SWNT with PBZ, dependent upon the level and arrangement of —COCl groups on the SWNT, i.e., how many —COCl moieties are bonded to each SWNT, and which end or both ends of the SWNTs that the —COCl moieties are bonded to, and the functionality at the ends of the PBZ reactant.

For the above-described SWNT/PBZ block copolymers of the present invention, the product compositions range from between about 5/95 SWNT/PBZ (wt/wt %) to 95/5 SWNT/PBZ (wt/wt %). In some embodiments, it is desirable to have as high a content of SWNT as possible.

Advantages of block copolymerizing rigid rod polymers with SWNTs include minimal compromise in the resulting material's ultimate performance, as well as the economics and current understanding of rigid rod polymer systems, i.e., they are relatively inexpensive, commercially available, and the fiber spinning of rigid rod polymer systems like PBO is well known. Additionally, they are soluble in acid solvents.

Other aspects of the present invention are processes of shaping the above solutions/compositions (i.e., Scheme 3) into useful articles such as fibers or films. In some embodiments, fibers made by the nanotube block copolymer compositions of the present invention have superior mechanical properties; superior chemical, thermal, thermo-oxidative, and dimensional stability; ultra-light weight; and unique electrical/electro-magnetic properties suitable for structural application as the fiber component of advanced composites for aerospace and space vehicles. Other utility can be found in electronic and electrical applications, and also in protective body (personal, vehicular, structural) armors. The above mentioned properties can surpass those of state of the art organic fibers such as ZYLON (Zylon® is a registered trademark of Toyobo Co., Ltd., Osaka, Japan), for example, or other advanced carbon fibers currently being used in the above-mentioned applications.

The current art of spinning fibers of neat SWNTs (with indiscriminate lengths) or casting neat SWNT films has had limited success with regard to fully realizing the potential of SWNTs [Ericson et al., Science, 2004, 304, 1447-1450]. This is partly due to the low solubility of SWNTs in common organic or mineral acid solvents, and the intractability of SWNT ropes, i.e., aggregates of individual SWNT, readily formed during or before the dissolution process. Also, the current art of spinning composite SWNT fibers from solutions of physical mixtures of SWNTs of indiscriminate lengths (as opposed to the cut, shortened SWNTs used in some embodiments of the present invention) with other polymers, including PBO, has had limited success due to the relatively low level of dispersability of SWNTs in these polymers.

The present invention teaches, in part, the covalently bonding of short (shortened) SWNTs with rigid rod polymers of finite length. The shorter length improves the solubility of SWNTs in mineral acids and other solvents and minimizes the formation of aggregates (ropes) of SWNT. Furthermore, rigid rod polymers like PBZ are readily soluble in such above-described acids and can impart the short SWNTs with increased solubility (and processability) when covalently attached to the short SWNTs in the form of a block copolymer. Consequently, the spinning or casting of SWNT/PBZ copolymers can be carried out with liquid crystalline solutions at higher concentrations which afford a more effective coagulation process and easy alignment of SWNT/PBZ copolymers during the spinning process. Also, in some embodiments, the incorporation of PBZ with SWNT can improve the strength ("leg") of the spinning or casting solutions due to stronger interaction between PBZ molecules. This generally improves the shaping process and generally leads to shaped articles with ultra-high performance properties afforded by SWNT.

The following example is provided to more fully illustrate some of the embodiments of the present invention. It should be appreciated by those of skill in the art that the techniques disclosed in the example which follows represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

EXAMPLE

While not intending to be bound by theory, this Example serves to illustrate, by virtue of Halpin-Tsai equations, the reinforcement efficiency of incorporating cut SWNTs into rigid rod block copolymer materials. For:

$$E_c = ((1 + \alpha \mu v_f)/(1 - \mu v_f))E_m$$

$$\alpha \sim 2(l/d)$$

$$\mu = (E_f/E_m - 1)/(E_f/E_m + \alpha)$$

where:
$E_c$=Young's modulus of composite fiber
$E_m$=Young's modulus of matrix (PBO)
$E_f$=Young's modulus of SWNT
l=length of SWNT, d=diameter of SWNT
$\alpha$=2*(aspect ratio of SWNT)
$v_f$=volume fraction of SWNT
$v_m$=volume fraction of PBO.

The reinforcement efficiency of SWNT is defined as: $RE = E_c/(E_f v_f + E_m v_m)$, and $(E_f v_f + E_m v_m)$ represents the ultimate linear rule-of-mixture modulus of a uniaxially oriented composite. Thus, for a 50/50 v/v % SWNT/PBO composite fiber, the calculated RE, using the above equations, is 1 (or 100% reinforcement efficiency) for SWNTs with aspect ratio of 10 and $E_f/E_m$ of 5. On the other hand, when a softer matrix is used, e.g., $E_f/E_m$=50, it would require the aspect ratio of SWNTs to be at least 200 in order to achieve 95% reinforcement efficiency. This simply means that with a rigid matrix such as PBO, very short SWNTs can be utilized as reinforcement without any degradation in reinforcement efficiency.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A block copolymer comprising:
   a) a first block material comprising short single-wall carbon nanotubes (SWNTs); and
   b) a second block material comprising a rigid rod aromatic polymer.

2. The block copolymer of claim 1, wherein said block copolymer is selected from the group consisting of di-block copolymers, tri-block copolymers, random-block copolymers, and combinations thereof.

3. The block copolymer of claim 1, wherein the short single-wall carbon nanotubes have lengths that range from about 10 nm about 100 nm.

4. The block copolymer of claim 1, wherein the short single-wall carbon nanotubes aspect ratios that range from about 10 about 100.

5. The block copolymer of claim 1, wherein the rigid rod aromatic polymer is a polybenzazole (PBZ) providing for a SWNT/PBZ block copolymer.

6. The block copolymer of claim 5, wherein the composition of the SWNT/PBZ block copolymers ranges from about 5/95 SWNT/PBZ (wt/wt %) to about 95/5 SWNT/PBZ (wt/wt %).

7. The block copolymer of claim 1, wherein the rigid rod aromatic polymer is polybenzoxazole (PBO).

8. The block copolymer of claim 1, wherein the rigid rod aromatic polymer comprises a number of repeat units that ranges from about 2 to about 2000.

9. The block copolymer of claim 1, wherein the rigid rod aromatic polymer comprises a number of repeat units that ranges from about 5 to about 50.

10. The block copolymer of claim 1, wherein the rigid rod aromatic polymer comprises a number of repeat units that ranges from about 5 to about 30.

11. A fiber comprising the block copolymer material of claim 1.

12. A film comprising the block copolymer material of claim 1.

13. A method comprising the steps of:
   a) providing a first block material comprising short single-wall carbon nanotubes comprising acyl chloride groups on their ends;
   b) providing a second block material comprising polybenzazole (PBZ) polymers comprising azole-forming moieties on their ends; and
   c) copolymerizing the first block material with the second block material to form a block copolymer material.

14. The method of claim 13, wherein the step of copolymerizing is carried out in a strong acid capable of dissolving both reactants without degradation of either of said reactant.

15. The method of claim 14, wherein the strong acid in which the first block material with the second block material are copolymerized is selected from the group consisting of sulfuric acid, methanesulfonic acid, trifluoromethanesulfonic acid, polyphosphoric acid, $P_2O_5$, chlorosulfuric acid, and combinations thereof.

16. The method of claim 13, wherein the short single-wall carbon nanotubes have lengths that range from about 10 nm about 100 nm.

17. The method of claim 13, wherein the short single-wall carbon nanotubes have aspect ratios that range from about 10 about 100.

18. The method of claim 13, wherein the second block material comprising polybenzazole (PBZ) polymers is polybenzoxazole (PBO).

19. The method of claim 13, wherein the azole-forming moieties on the ends of said second block material comprising polybenzazole (PBZ) polymers comprise an o-aminobasic moiety.

20. The method of claim 13 further comprising a step of spinning the block copolymer material into a fiber.

21. The method of claim 13 further comprising a step of casting the block copolymer material into a film.

22. The method of claim 13 further comprising a step of shaping the block copolymer material into a particular shape.

* * * * *